R. G. VAWTER.
SOLDERING IRON.
APPLICATION FILED DEC. 20, 1913.

1,092,678.

Patented Apr. 7, 1914.

Witnesses
Frederick H Taylor
D. W. Gould

Inventor
Robert G. Vawter

By Victor J. Evans
Attorney

UNITED STATES PATENT OFFICE.

ROBERT GWINN VAWTER, OF WOODSTOCK, VIRGINIA.

SOLDERING-IRON.

1,092,678.
Specification of Letters Patent.
Patented Apr. 7, 1914.

Application filed December 20, 1913. Serial No. 808,032.

*To all whom it may concern:*

Be it known that I, ROBERT G. VAWTER, a citizen of the United States, residing at Woodstock, in the county of Shenandoah and State of Virginia, have invented new and useful Improvements in Soldering-Irons, of which the following is a specification.

The invention relates to an improvement in soldering irons and particularly to a self-heating magazine soldering iron.

The main object of the present invention is the provision of a self-heating magazine soldering iron, in which the soldering material in its flow from the magazine is manually controlled at the will of the user, whereby the iron is completely effective for all purposes for which such irons can or may be used.

The invention in the preferred form of details will be described in the following specification, reference being had particularly to the accompanying drawings, in which:—

Figure 1:
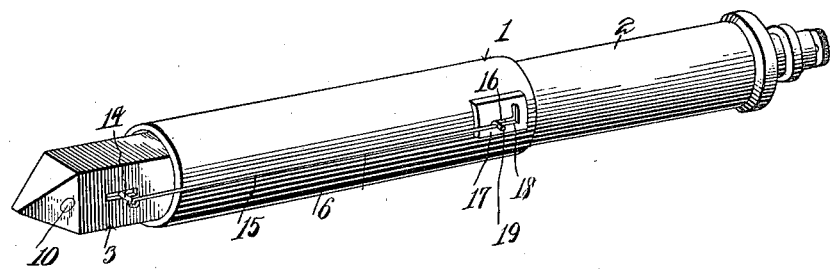
Figure 2:
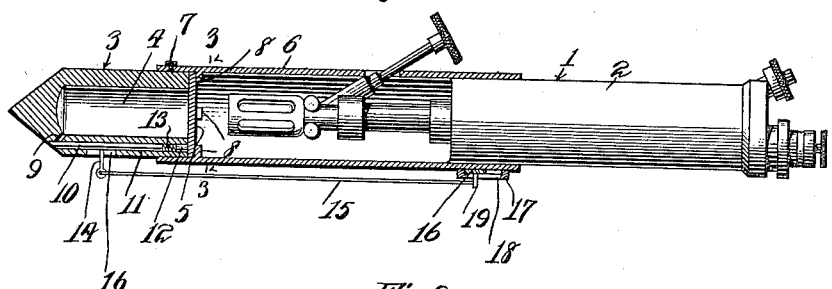
Figure 3:
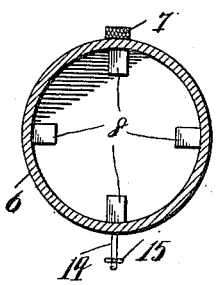

Figure 1 is a perspective view of the improved soldering iron. Fig. 2 is a longitudinal central section of the same. Fig. 3 is a section on line 3—3 of Fig. 2.

The present improvement is directed particularly to improving the copper or soldering end of the tool, the heating portions of the tool being formed with the ordinary blow torch 1 including a fuel tank 2 and the remaining parts necessary to create the proper degree of heat. The details of the blow torch are not material to the present invention, and it is to be understood in this connection that I contemplate the use of any ordinary or preferred type of blow torch for the purpose.

The improved copper 3 is formed with a longitudinally cored out centrally arranged chamber 4 forming the material magazine, the chamber being open at its inner end and closed by a cover 5. A sleeve like casing 6 is removably secured to the fuel reservoir 2, and to the copper 3 preferably through the medium of the threaded plug or pin 7 passing through the casing and taking into the copper, the casing including a burner, feed tube and other necessary parts of the blow torch in advance of the fuel tank. The interior of the casing 6 is formed at an appropriate point with a series of inwardly extending projections or lugs 8 designed when the casing is in place on the copper to bear against the cover 5 of the magazine and secure same in magazine closing relation, as will be obvious from Fig. 2 of the drawings.

The magazine 4 is formed with an outlet 9 opening through one inclined face of the point of the copper, and this outlet is controlled by the valve in the form of a rod 10 slidably mounted in the channel 11 formed in the copper beyond the magazine. The channel extends from end to end of the magazine and at the end remote from the outlet is interiorly threaded to receive a plug 12 between which and the adjacent end of the valve rod 10 is arranged a spring 13 tending to normally maintain the valve seated. The valve rod 10 is provided with a pin 14 extending laterally therefrom through an elongated recess 16 in the outer wall of the channel 11, the pin being connected through the medium of the wire or similar flexible connector 15 with the plate 16 slidably held between the casing 6 and the bearing plate 17 secured thereon. The plate 17 is secured upon the casing adjacent the rear end thereof, or within convenient reach of the operator in the handling of the tool. The plate 17 is formed with right angled slit 18 and the operating pin 19 projects from the plate 16 and through the slot, the pin projecting sufficiently far beyond the plate 17 to permit the same being engaged with the finger of the operator.

In use, it will be obvious that the operator by suitably manipulating the valve, will discharge any desired quantity of the material on the article to be soldered by manipulating the valve through the use of the finger of the hand holding the tool and that by reason of the right angled slot the valve may be locked in open position or may be released to close by the spring.

What is claimed is:—

1. A soldering iron including a blow torch, a casing carried thereby, a copper removably secured in the casing and formed with a magazine, a closure for the magazine held in magazine closing position by the casing, said magazine being formed with an outlet, a valve rod controlling the outlet, a manually operable member carried by the casing, and a connection between said member and the valve rod.

2. A soldering iron including a blow torch, a casing carried thereby, a copper removably secured in the casing and formed with a magazine, a closure for the magazine held in magazine closing position by the casing, said magazine being formed with an outlet and with a channel communicating with said outlet, a rod slidably mounted in the channel, a spring for moving the rod longitudinally of the channel and closing the outlet, and a flexible connector secured to the rod and operable from the relatively remote end of the casing, whereby to move the rod to open the outlet.

In testimony whereof I affix my signature in presence of two witnesses.

ROBT. GWINN VAWTER.

Witnesses:
ALBERT REYNOLDS,
WALTER C. FRINGER.